US008783782B2

(12) United States Patent  (10) Patent No.: US 8,783,782 B2
Park  (45) Date of Patent: Jul. 22, 2014

(54) SAFETY BELT FOR A VEHICLE

(76) Inventor: Nam-Young Park, Incheon (KR)

(*) Notice: Subject to any disclaimer, the term of this patent is extended or adjusted under 35 U.S.C. 154(b) by 328 days.

(21) Appl. No.: 13/260,710

(22) PCT Filed: Sep. 17, 2010

(86) PCT No.: PCT/KR2010/006382
§ 371 (c)(1),
(2), (4) Date: Sep. 27, 2011

(87) PCT Pub. No.: WO2011/046304
PCT Pub. Date: Apr. 21, 2011

(65) Prior Publication Data
US 2012/0019042 A1 Jan. 26, 2012

(30) Foreign Application Priority Data
Oct. 13, 2009 (KR) .................. 10-2009-0097338

(51) Int. Cl.
B60R 22/00 (2006.01)
(52) U.S. Cl.
USPC ........................................ 297/484; 297/475
(58) Field of Classification Search
USPC .................. 297/467, 475, 477, 483, 484
See application file for complete search history.

(56) References Cited

U.S. PATENT DOCUMENTS

| 5,387,028 | A  | * | 2/1995  | Fulgenzi et al. | 297/470 |
| 5,580,126 | A  | * | 12/1996 | Sedlack | 297/256.15 |
| 5,653,504 | A  | * | 8/1997  | Henson | 297/238 |
| 6,293,588 | B1 | * | 9/2001  | Clune | 280/808 |
| 6,773,075 | B2 | * | 8/2004  | Rouhana et al. | 297/484 |
| 6,817,629 | B2 | * | 11/2004 | Herberg et al. | 280/801.1 |
| 7,506,833 | B2 | * | 3/2009  | Tanaka | 242/374 |
| 7,566,075 | B2 | * | 7/2009  | Latour et al. | 280/808 |
| 8,016,318 | B2 | * | 9/2011  | Nezaki | 280/733 |
| 8,303,043 | B2 | * | 11/2012 | Humbert | 297/477 |
| 2004/0036345 | A1 | * | 2/2004  | Herberg et al. | 297/480 |
| 2005/0073187 | A1 | * | 4/2005  | Frank et al. | 297/484 |

FOREIGN PATENT DOCUMENTS

| KR | 1998-0033504 U | 7/1998 |
| KR | 1020020081436 | 10/2002 |
| KR | 1020060016398 | 2/2006 |

* cited by examiner

Primary Examiner — Peter Brown
(74) Attorney, Agent, or Firm — IPLA P.A.; James E. Bame

(57) ABSTRACT

A safety belt for a vehicle which can be worn in a manner of wearing suspenders to prevent a concentration of pressure to a part of the body of a seat occupant, and to uniformly distribute impact to thereby safely protect the seat occupant even upon the occurrence of an emergency during travel. To accomplish the above-described object, the safety belt for a vehicle according to the present invention comprises a pair of belts spaced apart from each other in a vertical direction on the front surface of a seatback and a connection unit for interconnecting the pair of belts.

17 Claims, 11 Drawing Sheets (a)

(b)

SAFETY BELT FOR A VEHICLE

BACKGROUND OF THE INVENTION

1. Field of the Invention

The present invention relates generally to safety belts for vehicles and, more particularly, to a safety belt for a vehicle which is configured in such a way that a user wears the seat belt in a manner similar to that of suspenders so that pressure is prevented from being concentrated on a portion of the body of the user, and impact is evenly dispersed to the body of the user, thus safely protecting the user even if an unexpected accident occurs when the vehicle is in motion.

2. Description of the Related Art

Generally, in traffic accidents, such as vehicle collision or rollover accidents, people in vehicles are mainly injured by the following reasons: a person in a vehicle which has been in motion is thrown out of the vehicle under the influence of inertia and is shocked by colliding with the road; a driver collides with the windshield, dashboard, etc., resulting in serious head or neck damage; or the chest of the driver is damaged by colliding with the steering wheel.

Although safety belts for vehicles cannot fundamentally prevent traffic accidents, they hold users, who are sitting on seats, to prevent the users from being thrown out of the vehicles or colliding with parts in the passenger compartments when traffic accidents occur. Therefore, safety belts mitigate the fatality rate or the extent of injuries in traffic accidents. Further, laws have been established to make it mandatory to wear safety belts.

Safety belts for vehicles must be able to reliably protect users in case of an emergency. Particularly, in the case of the driver's seat, the safety belts must not make it inconvenient for drivers to drive vehicles.

As shown in FIG. 1, such a safety belt for a vehicle typically includes a belt 10 which supports the body of a user, a retractor 12 around which the belt 10 is wound, a tongue plate 14 which is coupled to the belt 10, a buckle 16 to which the tongue plate 14 coupled to the belt 10 is fastened to hold the belt 10, and an anchor 18 which is used as a shaft for supporting the belt 10. The belt 10 comprises a shoulder belt part 10a and a waist belt part 10b.

As such, it is obvious that the safety belts for vehicles are very effective at reducing human injury or fatalities in accidents.

In other words, wearing a safety belt markedly reduces the extent of injury compared to when it is not worn. However, despite wearing the safety belt, the neck, stomach, chest, waist, etc., of a user may be injured.

In detail, the safety belt includes the shoulder belt part, and the waist belt part. In a collision, the shoulder belt part supports the upper body of the user, and the waist belt part supports the pelvic region. However, because the position at which the waist belt part is disposed on the body of the user is unstable, for example, if the user sits in such a way that his/her back is bent when the vehicle is in motion, in the majority of cases, the waist belt part is disposed on the lower abdomen rather than being maintained in the initial position. In this case, a collision may cause problems, such as enterorrhexis, fracturing of the spine, etc.

Furthermore, in a collision, the belt is prevented from being unwound, but the upper body of the user is biased forwards by inertial force. Due to this, as the length of the shoulder belt part extends, the waist belt part is tightened, thus causing enterorrhexis, fracture of spine, etc.

In addition, under normal conditions, the safety belt compresses portions of the body of the user, making the user uncomfortable. Thus, some drivers may use a clip to loosen the belt when driving a vehicle. This is very dangerous, for example, increasing the extent of injury, when a collision occurs.

Moreover, if the safety belt that the user is wearing loosens, when an airbag deploys in a collision, the airbag may intensively strike the upper body of the user.

In this case, a large impact is applied to the user by the pressure of the airbag just as the airbag strikes the user. This may cause the user to be injured by, for example, a neck fracture.

Further, if the user inclines the seat back rearwards to take a comfortable position, the safety belt cannot reliably support the user because it is spaced apart from the body of the user. In a collision, the body of the user is tossed forwards, thus increasing the extent of injury.

Meanwhile, the conventional safety belt is designed for an adult. Therefore, in the case of an infant or child, a separate infant safety belt is required. Expenses for purchasing the separate infant safety belt increase the financial burden. Furthermore, a lot of time is required to install the infant safety belt.

SUMMARY OF THE INVENTION

Accordingly, the present invention has been made keeping in mind the above problems occurring in the prior art, and an object of the present invention is to provide a safety belt for a vehicle in which belts are configured in a shape similar to that of suspenders so that the belts support the shoulders of a user, for example, a driver, who is sitting on a seat, thus preventing pressure from being concentrated on portion of the body of the driver when the vehicle is in motion, thereby making it possible for the driver to drive the vehicle in a comfortable position.

Another object of the present invention is to provide a safety belt for a vehicle in which because the belts support the shoulders of the driver, the impact of a vehicle collision can be evenly dispersed across the entire upper body of the driver, thus more effectively preventing the driver from being injured.

A further object of the present invention is to provide a safety belt for a vehicle in which each of a buckle and a tongue plate has an insert slot to which the corresponding belt is coupled, and a twist prevention slot which prevents the belt from being twisted, and the belt is double-coupled to the insert slot and the twist prevention slot, thus more reliably preventing the belt from being twisted.

Yet another object of the present invention is to provide a safety belt for a vehicle in which retractors are received in a rear surface of a seat back, and the upper end of each retractor is rotatably supported by a hinge, so that even when the driver adjusts the angle at which the seat back is inclined depending on the body type of the driver, the retractors can consistently stay in the vertical state, thus preventing the retractors from malfunctioning.

Still another object of the present invention is to provide a safety belt for a vehicle in which the retractors that are received in the rear surface of the seat back are covered with a cover plate, thus facilitating repair or maintenance of the retractors.

Still another object of the present invention is to provide a safety belt for a vehicle in which each retractor is provided with a control unit so that when the vehicle which is in motion reaches a preset speed, the belt is automatically restricted from being unwound from the retractor, thus stably supporting the driver on the seat back and protecting the driver from safety accidents which may be caused while the vehicle is in motion.

Still another object of the present invention is to provide a safety belt for a vehicle in which belt guide members are provided on the upper end of the seat back to guide the corresponding belts such that the belts pass over the same portions of both sides of the body of the driver, thereby preventing the driver from suffering from enterorrhexis, fracture of spine, etc. in a vehicle collision.

Still another object of the present invention is to provide a safety belt for a vehicle in which a release pin is provided in the buckle to allow the driver to forcibly unfasten the safety belt, so that even if the safety belt cannot be unfastened when a vehicle collision occurs, the driver can use the release pin to forcibly unfasten the safety belt and safely escape from the vehicle which has been in an accident.

In order to accomplish the above object, in an aspect, the present invention provides a safety belt for a vehicle, including: a pair of belts disposed on a front surface of a seat back in a vertical direction at positions spaced apart from each other; and a fastening unit for fastening the pair of belts to each other.

In another aspect, the present invention provides a safety belt for a vehicle, including: a pair of retractors provided in a rear surface of a seat back; a pair of belts extracting from the respective retractors and extending on a front surface of the seat back in a vertical direction; and a fastening unit for fastening the pair of belts to each other.

Preferably, an installation depression may be formed in the rear surface of the seat back, and a hinge shaft may be provided in the installation depression, wherein the retractors are disposed in the installation depression and are rotatably coupled to the hinge shaft.

Furthermore, stoppers may be provided on the hinge shaft on opposite sides of each of the retractors.

In addition, guide depressions may be formed in the seat back. The guide depressions may extend from the installation depression in a vertical direction.

The safety belt may further include a cover plate covering the rear surface of the seat back.

The safety belt may further include belt guide members respectively provided at both sides on an upper end of the seat back, the belt guide members guiding the corresponding belts.

Each of the belt guide members may include: a casing fastened to the upper end of the seat back, with holes respectively formed in front and rear ends of the casing; and a guide shaft provided in the casing.

Each of the retractors may include: a body to which a drum is coupled, the drum having ratchet teeth, wherein the corresponding belt is wound around the drum; a ball disposed in the body at a predetermined position below the ratchet teeth, with a control shaft coupled to the ball; a ball housing onto which the ball is seated, the ball housing having a hole into which a lower end of the control shaft is inserted; and an operating lever having a pawl at a predetermined position thereof, the pawl being locked to or removed from the ratchet teeth when the ball is moved by vertical movement of the control shaft.

The retractor may further include a control unit controlling unwinding of the belt.

The control unit may include: a motor provided in a side of the body of the retractor in which the ratchet teeth are formed; and a rotary member reversibly rotated by the motor, with a contact protrusion provided on a circumferential outer surface of the rotary member, the contact protrusion coming into contact with or moving away from the control shaft.

The safety belt may further include a control box operating the motor.

The safety belt may further include a switch provided on the control box so that when the switch is operated, the pawl of the operating lever which has been locked to the ratchet teeth is removed from the ratchet teeth for a predetermined time.

The safety belt may further include anchors coupled to ends of the respective belts, the anchors being fixed to opposite sidewalls of a lower end of the seat back so that the belts are disposed on opposite sides of the front surface of the seat back.

The fastening unit may include: a tongue plate provided on either of the pair of belts; and a buckle provided on a remaining one of the pair of belts at a position corresponding to the tongue plate so that the tongue plate is removably fastened to the buckle.

The tongue plate may include a hook locked to or unlocked from the buckle. The tongue plate may have: a first insert slot into which the corresponding belt is inserted, the first insert slot being disposed at a side opposite to the hook; and a first twist prevention slot into which the belt is inserted, the first twist prevention slot being disposed at a position adjacent to the first insert slot and at a slant with respect to the first insert slot to prevent the belt from being twisted.

The buckle may include a connection member disposed on a first end of the buckle opposite to a second end thereof to which the tongue plate is fastened. The connection member may have: a second insert slot into which the corresponding belt is inserted; and a second twist prevention slot into which the belt is inserted, the second twist prevention slot being disposed at a position adjacent to the second insert slot and at a slant with respect to the second insert slot to prevent the belt from being twisted.

Furthermore, an open recess may be formed in the first end of the buckle in such a way that the first end of the buckle is open, wherein seating depressions corresponding to each other may be formed in respective inner sidewalls of the open recess, and a through hole may be formed in each of the seating depressions. A cover member may be provided on the buckle to cover the seating depression, the cover member being hinged at a first end thereof to the buckle, with a coupling hole formed in a second end of the cover member. A release pin may be inserted into the through holes of the open recess via the coupling hole of the cover member.

The connection member may include an insert part inserted into the open recess of the buckle, the insert part having seating protrusions seated into the respective seating depressions.

The release pin may have a handle on a first end thereof, with a locking ball provided in a second end of the release pin.

Each of the tongue plate and the connection member may have an arc shape that is concave with respect to a body of a user, and the buckle may have an arc shape that is convex to correspond to the arc shape of the connection member.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Hereinafter, a safety belt for a vehicle according to the present invention will be described in detail with reference to the attached drawings.

Figure 1:
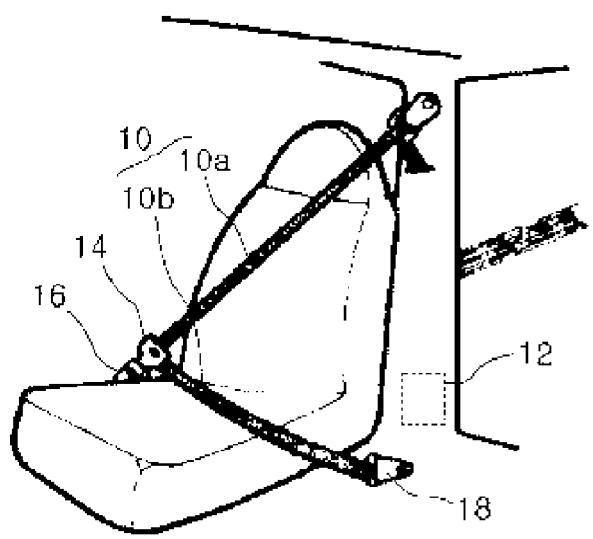
FIG. 1 is a view showing a conventional safety belt for a vehicle.
Figure 2:
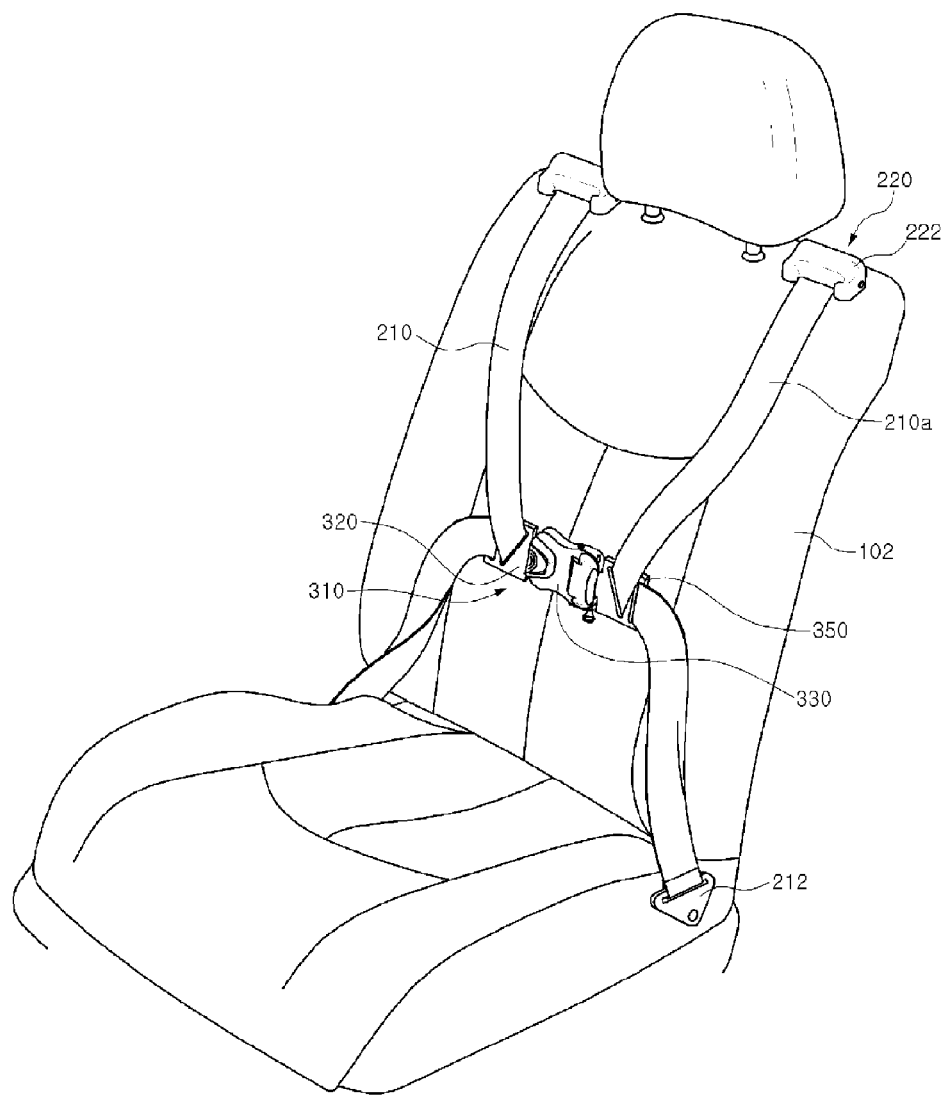
FIG. 2 is a perspective view illustrating a safety belt for a vehicle, according to an embodiment of the present invention.
Figure 3:
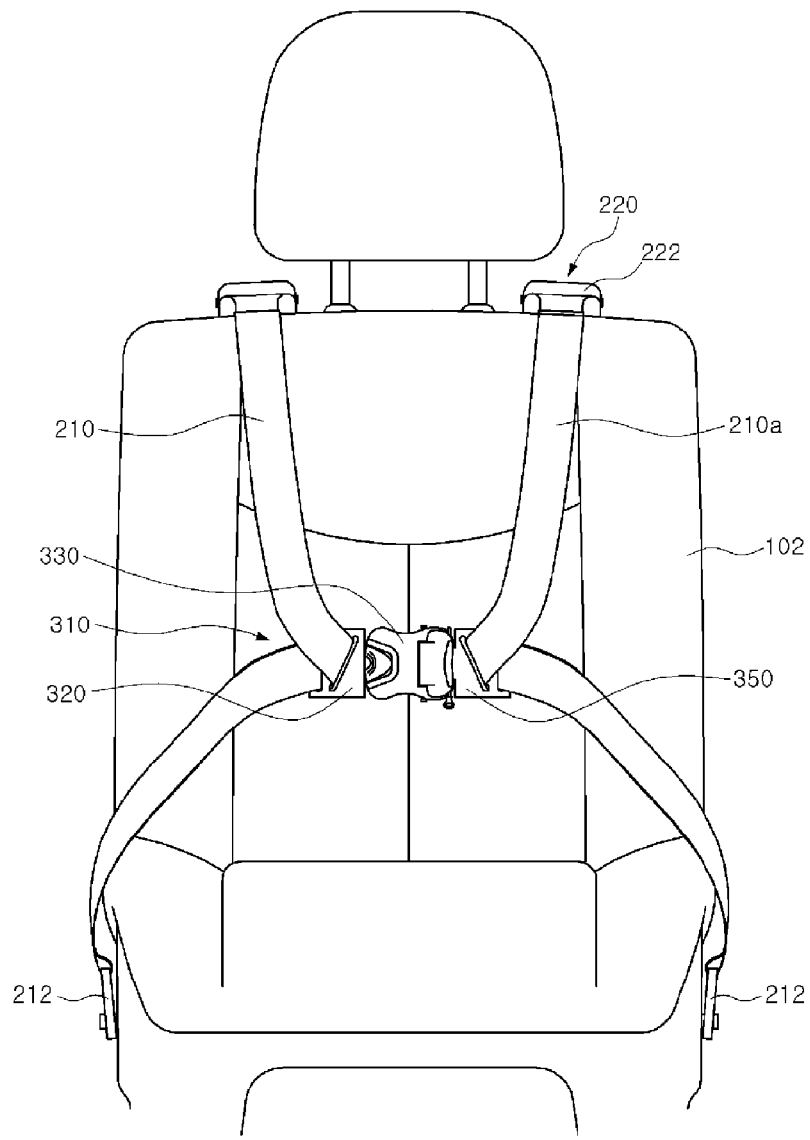
FIG. 3 is a front view illustrating the safety belt according to the present invention.
Figure 4A:
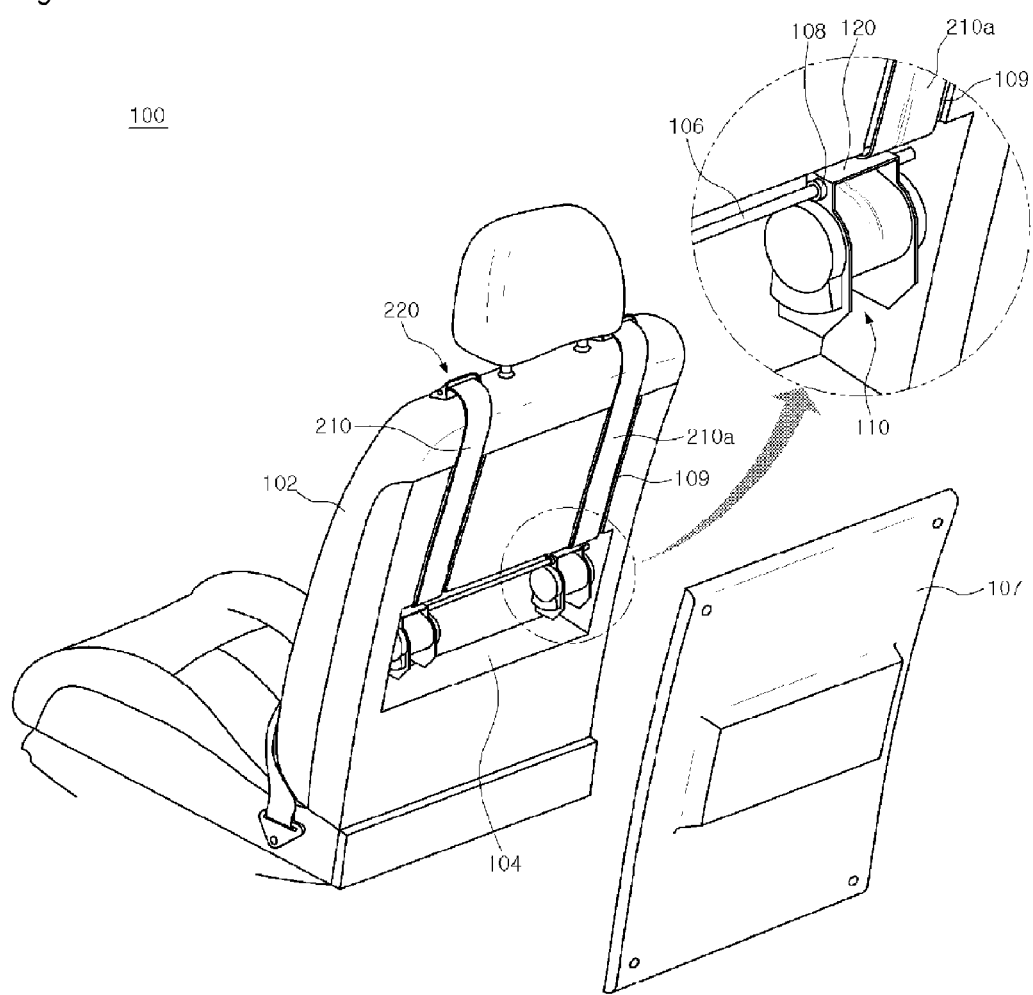
FIG. 4A is an exploded perspective view showing the installation of retractors according to the present invention.
Figure 4B:
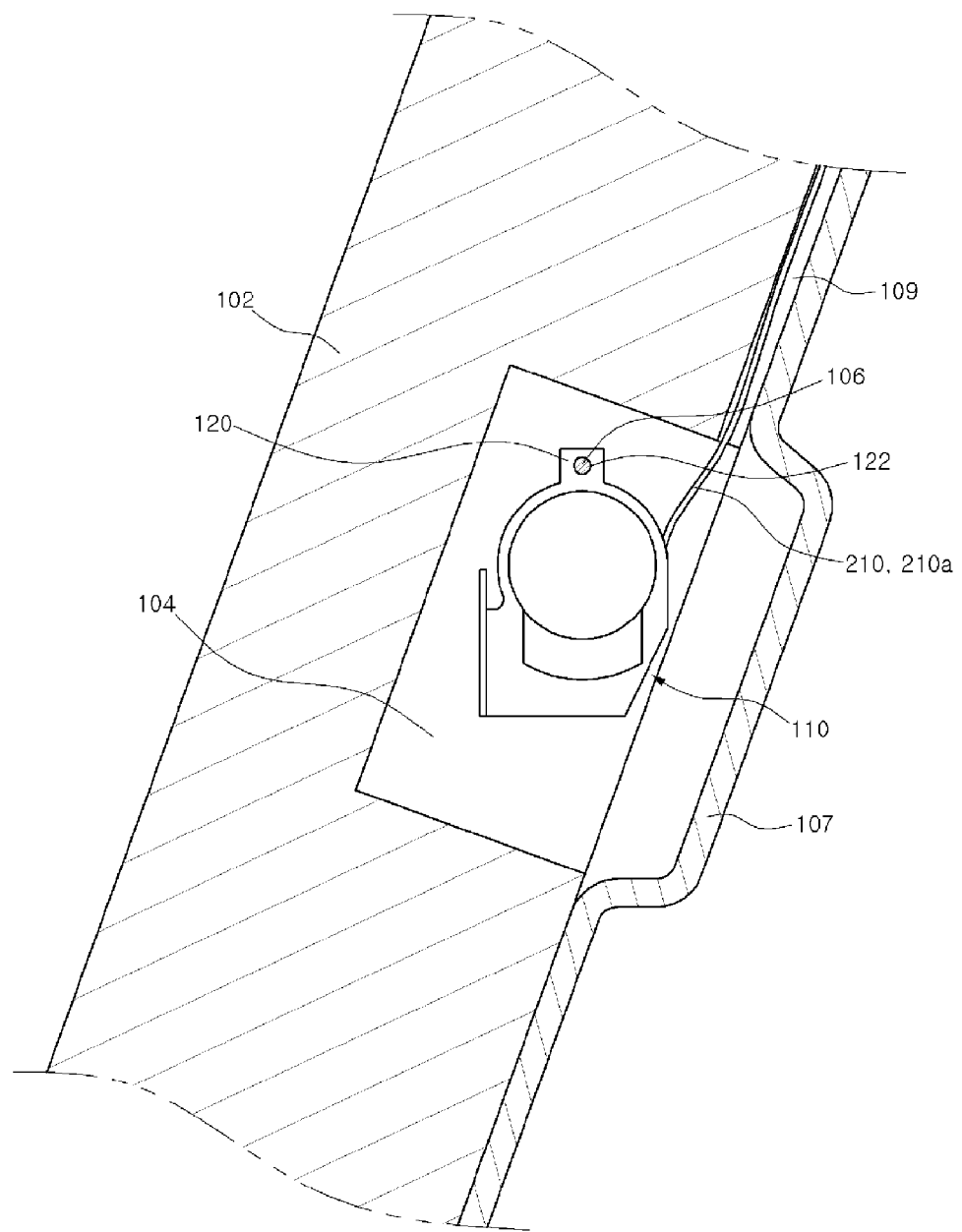
FIG. 4B is a sectional view showing the installation of the retractor according to the present invention.
Figure 5A:
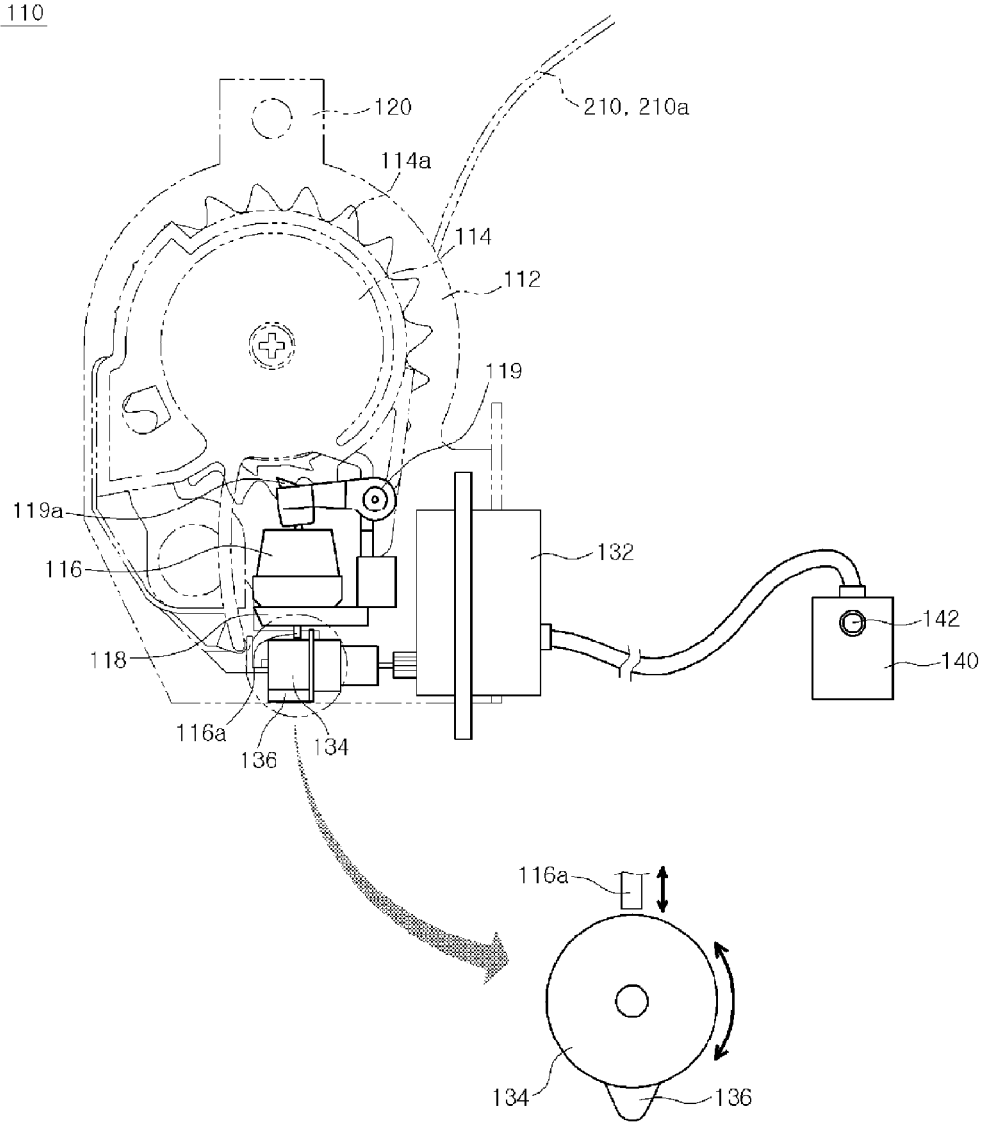
FIGS. 5A and 5B are views showing a control unit installed in the retractor according to the present invention.
Figure 5B:
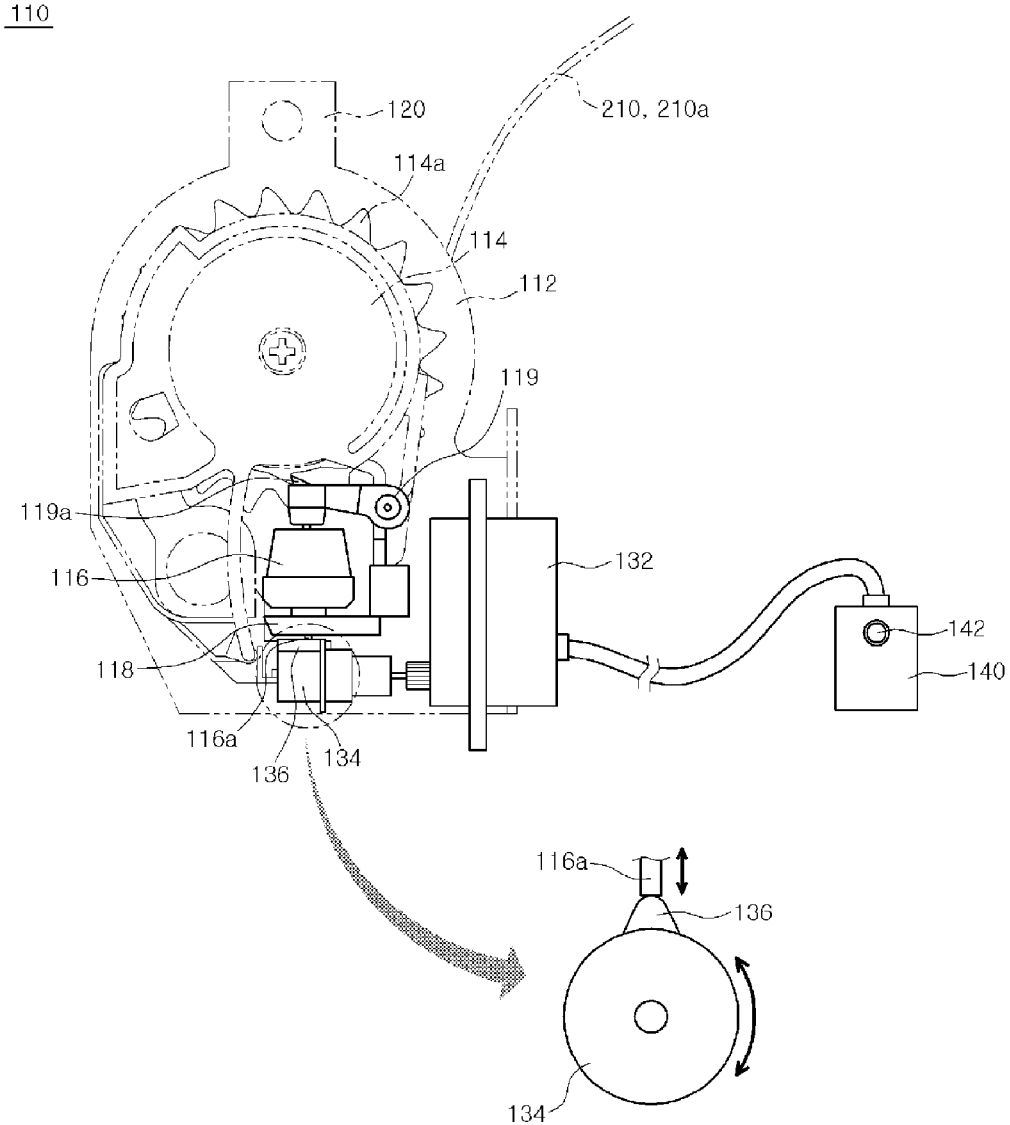
Figure 6:
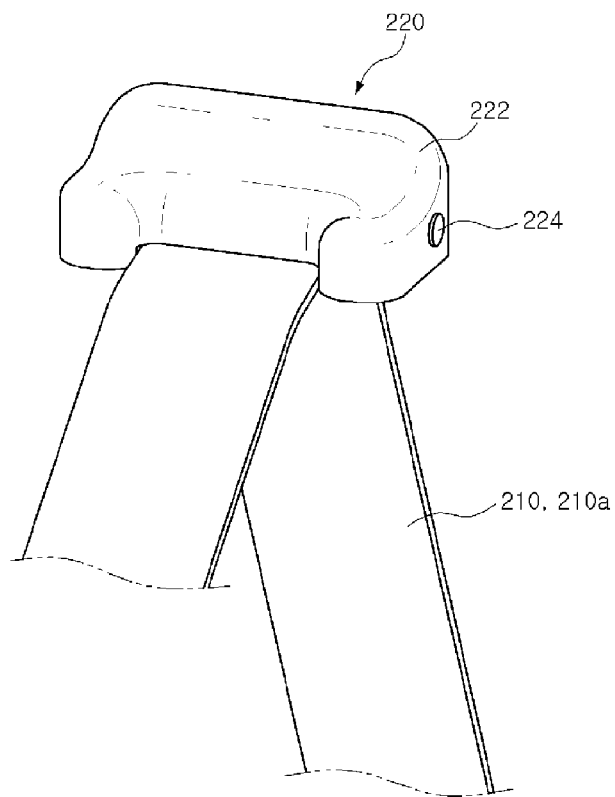
FIGS. 6A and 6B are views showing a belt guide member according to the present invention.
Figure 6:
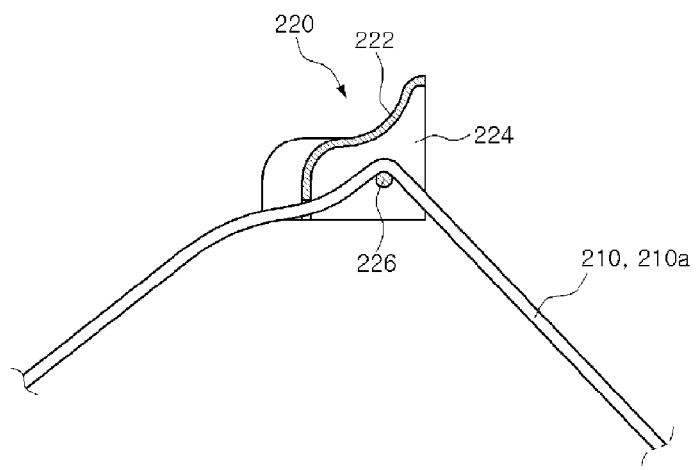
Figure 7:
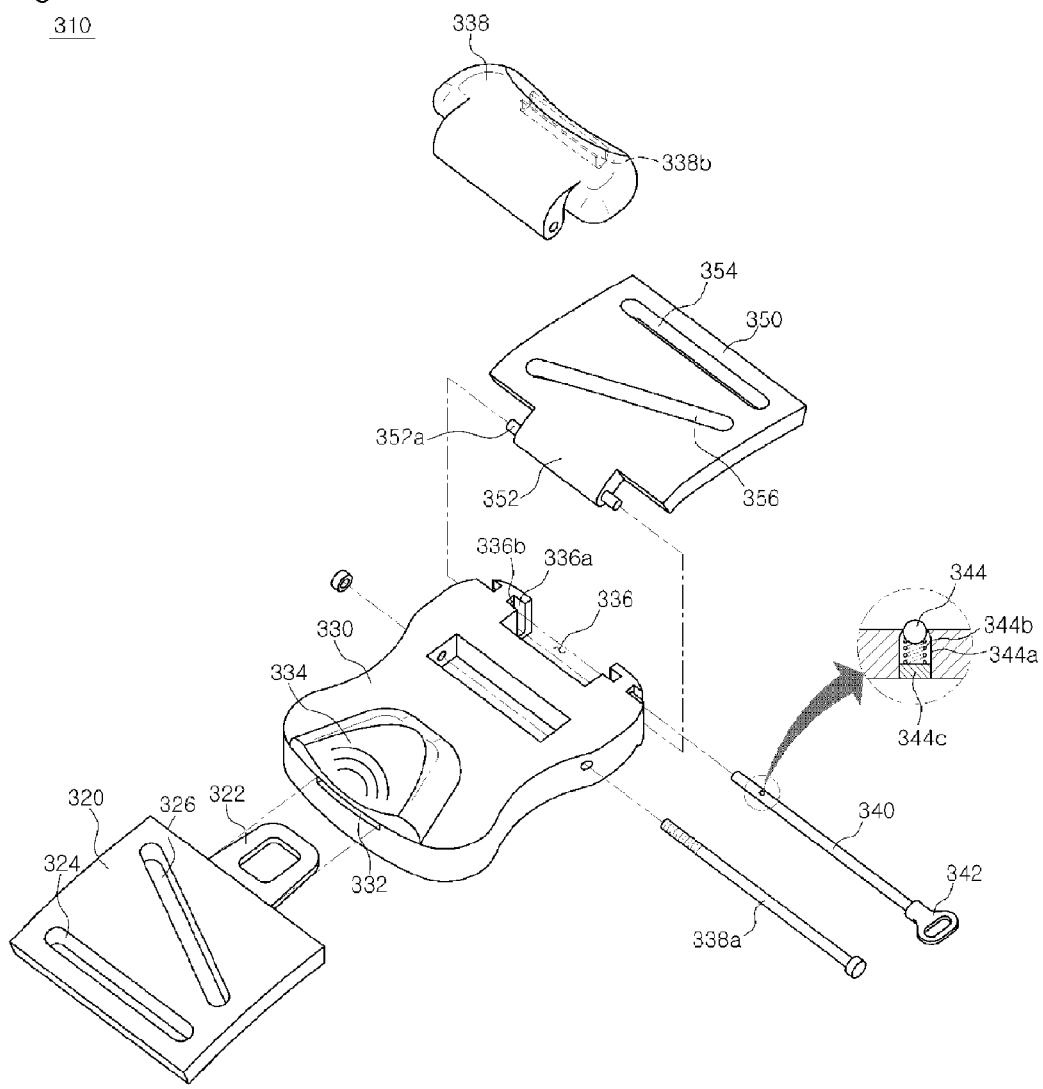
FIG. 7 is an exploded perspective view illustrating a fastening unit according to the present invention.
Figure 8:
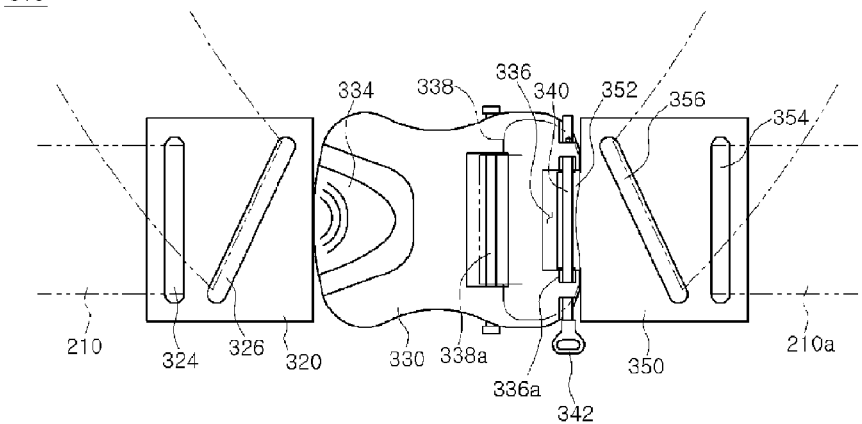
FIG. 8 is a plan view illustrating the fastening unit according to the present invention.

FIG. 2 is a perspective view illustrating the safety belt for a vehicle, according to an embodiment of the present invention. FIG. 3 is a front view illustrating the safety belt according to the present invention. FIG. 4A is an exploded perspective view showing the installation of retractors according to the present invention. FIG. 4B is a sectional view showing the installation of the retractor according to the present invention. FIGS. 5A and 5B are views showing a control unit installed in the retractor according to the present invention. FIGS. 6A and 6B are views showing a belt guide member according to the present invention. FIG. 7 is an exploded perspective view illustrating a fastening unit according to the present invention. FIG. 8 is a plan view illustrating the fastening unit according to the present invention.

As shown in FIGS. 2 through 8, the safety belt 100 according to the present invention includes a pair of retractors 110 which are installed in a rear surface of a seat back 102.

Each retractor 110 has the same structure as that of a typical retractor which is used for vehicle safety belts. The structure of the retractor 110 will be briefly explained below.

The retractor 110 includes a body 112 to which a drum 114 is coupled. The drum 114 has ratchet teeth 114a on a predetermined portion thereof. A belt 210, 210a is wound around the drum 114. A ball 116 is disposed in the body 112 at a predetermined position below the ratchet teeth 114a. A control shaft 116a is coupled in the vertical direction to the ball 116 in such a way that upper and lower ends of the control shaft 116a protrude upwards and downwards from the ball 116.

The retractor 110 further includes a ball housing 118 into which the lower end of the control shaft 116a is inserted, and onto which the ball 116 is seated. The refractor 110 further includes an operating lever 119 which has a pawl 119a at a predetermined position thereof. The pawl 1119a is locked to or removed from the ratchet teeth 114a when the ball 116 is moved by vertical movement of the control shaft 116a.

To install the retractors 110 each of which has the above-mentioned structure in the seat back 102, an installation depression 104 is formed in the rear surface of the seat back 102 to a predetermined depth. The two retractors 110 are installed in the installation depression 104 at positions spaced apart from each other by a predetermined distance.

In detail, a hinge shaft 106 is provided at an upper position in the installation depression 104. The retractors 110 are rotatably coupled to the hinge shaft 106. In an embodiment, a mounting bracket 120 is provided on an upper end of the body 112 of each retractor 110 and has a mounting hole 122 into which the hinge shaft 106 is inserted. Thus, the retractor 110 is rotatably coupled to the hinge shaft 106 in such a way that the hinge shaft 106 is inserted into the mounting hole 122 of the mounting bracket 120.

Furthermore, stoppers 108 are fastened to the hinge shaft 106 on opposite sides of the mounting bracket 102 to prevent the retractor 110 from undesirably moving along the hinge shaft 106 to the left or the right.

In the present invention, although the angle at which the seat back 102 is inclined is changed, the retractor 110 can be maintained in a vertical state because it is rotatable around the hinge shaft 106.

Further, a control unit 130 is provided in the body 112 of each retractor 110 to control unwinding of the belt 210, 210a.

The control unit 130 includes a motor 132 which is fastened to the body 112 of the retractor 110 at a position corresponding to the direction in which the ratchet teeth 114a are formed.

A rotary member 134 is provided on a motor shaft of the motor 132 and is rotated by the operation of the motor 132. The rotary member 134 is disposed under the ball housing 118 and has thereon a contact protrusion 136 which comes into contact with the lower end of the control shaft 116a that protrudes downwards from the ball housing 118, so that the control shaft 116a is vertically moved by the contact protrusion 136.

In the present invention, a control box 140 is provided to operate the motor 132 of the control unit 130.

In detail, a predetermined speed is set by a user and stored in the control box 140. When the vehicle reaches the preset speed, the motor 132 is automatically operated so that the contact protrusion 136 of the rotary member 134 moves the control shaft 116a upwards. Then, the pawl 119a of the operating lever 119 is disposed at an upper position to be locked to the ratchet teeth 114a, thus preventing the belt 210, 210a from being unwound from the retractor 110.

On the contrary, when the speed of the vehicle becomes lower than the preset speed, the control box 140 senses this and automatically operates the motor 132 so that the contact protrusion 136 of the rotary member 134 moves away from the control shaft 116a. Then, the control shaft 116a moves downwards to a lower position, thus allowing for the user to extract the belt 210, 210a from the retractor 110.

As such, when the speed of the vehicle reaches the preset speed, the control unit 130 receives this information from the control box 140 to operate the motor 132. Then, the rotary member 134 is rotated by the operation of the motor 132. Due to the rotation of the rotary member 134, the contact protrusion 136 pushes the control shaft 116a upwards. The control shaft 116a that moves upwards pushes the pawl 119a of the operating lever 119 upwards so that the pawl 119a engages with the ratchet teeth 114a, thus preventing the belt 210, 210a from being unwound.

Meanwhile, a switch 142 is provided on the control box 140 to allow the locking of the control unit 130 to be released by the demand of the user, who is wearing the safety belt 100, even when the speed of the vehicle exceeds the preset speed and the pawl 119a of the operating lever 119 has been locked to the ratchet teeth 114a.

Therefore, even when the pawl 119a of the operating lever 119 has been locked to the ratchet teeth 114a under the control of the control unit 130, as necessary, the pawl 119a of the operating lever 119 is released from the ratchet teeth 114a for a predetermined time. After the predetermined time has passed, the motor 132 is operated by the control of the control box 140 so that the pawl 119a of the operating lever 119 is locked to the ratchet teeth 114a again.

Furthermore, two guide depressions 109 are formed in the rear surface of the seat back 102 and extend from the installation depression 104 upwards. The guide depressions 109 function to guide the corresponding belts 210 and 210a extracted from the retractors 110.

The rear surface of the seat back 102 is covered with a cover plate 107. That is, the cover plate 107 is fastened to the seat back 102 by bolts or the like to cover the installation depression 104 and the guide depressions 109.

Meanwhile, the belts 210 and 210a are extracted from the two retractors 110, pass over the upper end of the seat back 102, and are disposed on opposite sides of a front surface of the seat back 102. Ends of the belts 210 and 210a are respectively fastened to anchors 212 which are fixed to opposite sidewalls of a lower end of the seat back 102.

In other words, the belts 210 and 210a are extracted from the retractors 110 and are disposed on opposite sides of the front surface on the seat back 102 in the shape of suspenders.

Therefore, the belts 210 and 210a that are disposed on the opposite sides of the front surface of the seat back 102 support the shoulders of the user in a manner similar to wearing suspenders, thus preventing the belts 210 and 210a from compressing the chest and abdomen of the user. Therefore, the user can not only sit on the seat in a comfortable position but can also comfortably drive the vehicle.

In this embodiment, belt guide members 220 which guide the corresponding belts 210 and 210a are provided on the upper end of the seat back 102 at both sides corresponding to the respective guide depressions 109.

Each belt guide member 220 includes a casing 222 which is fastened to a predetermined portion of the upper end of the seat back 102 by a fastening means and has a hole 224 therein. A guide shaft 226 which guides the belt 210, 210a is provided in the hole 224 of the casing 222.

Due to the belt guide members 220, the belts 210 and 210a which are extracted from the retractor 110 can always move based on the constant positions on the seat back.

Furthermore, a fastening unit 310 is provided on the belts 210 and 210a and fastens the belts 210 and 210a to each other to support a user who is sitting on the seat.

The fastening unit 310 includes a tongue plate 320 which is provided on one (for example, 210) of the belts 210 and 210a, and a buckle 330 which is provided on the other belt (210a). The tongue plate 320 is removably fastened into the buckle 330. One end of the tongue plate 320 has a hook 322 which is removably locked to the buckle 330. A first insert slot 324 into which the belt 210 is inserted is formed in the tongue plate 320 at a side opposite to the hook 322. A first twist prevention slot 326 into which the belt 210 is also inserted is formed in the tongue plate 320 at a position adjacent to the first insert slot 324 and is slanted at an angle with respect to the first insert slot 324 to prevent the belt 210 from being twisted.

The belt 210 is successively inserted into the first insert slot 324 and the first twist prevention slot 326. Thus, the user can easily adjust the position at which the tongue plate 320 is disposed. In addition, when the belt 210 is not in use, the tongue plate 320 can be maintained in a state of being in close contact with the seat back 102.

The buckle 330 has in a first end thereof a fastening hole 332 into which the hook 322 of the tongue plate 320 is inserted. A connection member 350 to which the belt 210a is coupled is provided on a second end of the buckle 330 that is opposite the fastening hole 332.

The buckle 330 includes a button 334 which is used to unlock the tongue plate 320 from the buckle 330. An open recess 336 is formed in the second end of the buckle 330 that is opposite to the button 334. Seating depressions 336a corresponding to each other are formed in respective inner sidewalls of the open recess 336. A through hole 336b is formed in each seating depression 336a in the lateral direction of the buckle 310.

A cover member 338 which covers seating depressions 336a is provided on the buckle 330 in such a way that a first end of the cover member 338 is rotatably coupled to the buckle 330 by a hinge 338a. A coupling hole 338b is formed in a lower portion of a second end of the cover member 338.

Further, a release pin 340 is inserted into the through holes 336b of the open recess 336 via the through hole 336b of the cover member 338.

In detail, a handle 342 is provided on a first end of the release pin 340 that protrudes outwards from the buckle 330. A locking ball 344 which prevents the release pin 340 from being undesirably removed from the buckle 330 is provided in a second end of the release pin 340 that protrudes outwards from the buckle 330 in the direction opposite to the direction in which the handle 342 protrudes outwards.

In detail, an installation hole 344a is formed through the second end of the release pin 340 in the lateral direction of the release pin 340. The locking ball 344 is inserted into the installation hole 344a. An elastic member 344b which elastically supports the locking ball 344 is provided in the installation hole 344a. A bolt 344c is threaded into the installation hole 344a to hold the elastic member 344b in the installation hole 344a.

Furthermore, the connection member 350 is inserted into the open recess 336 of the buckle 330. In an embodiment, an insert part 352 is provided on the corresponding end of the connection member 350. Seating protrusions 352a protrude outwards from the insert part 352 in opposite directions. The seating protrusions 352a are movably inserted into the corresponding seating depressions 336a so that the connection member 350 is movably coupled to the buckle 330.

Here, the seating protrusions 352a of the insert part 352 are inserted into the corresponding seating depressions 336a of the buckle 330 in such a way that the insert part 352 is disposed below the release pin 340.

Furthermore, a second insert slot 354 into which the belt 210a is inserted is formed in the connection member 350 at a side opposite the insert part 352. A second twist prevention slot 356 is formed in the connection member 350 at a position adjacent to the second insert slot 354 and slants with respect to the second insert slot 354 to prevent the belt 210a from being twisted.

A method of coupling the belt 210a to the connection member 350 is the same as the method of coupling the belt 210 to the tongue plate 320 through the first insert slot 324 and the first twist prevention slot 326.

In addition, the buckle 330 is movably coupled to the connection member 350. Therefore, when the belts 210 and 210a are not in use, the buckle 330 is rotated around the junction between the buckle 330 and the connection member 350 and is folded onto the connection member 350 to be brought into contact with the connection member 350. Thus, the buckle 330 can be stably maintained in a state of being in close contact with the seat back 102.

Meanwhile, when the user who is wearing the safety belt 100 is involved in a vehicle collision, the fastening unit 310 of the safety belt 100 may not be unlocked. At this time, the user holds the handle 342 of the release pin 340 and strongly pulls it. Then, the release pin 340 is removed from the buckle 330 so that the cover member 338 can be open. Thereby, the connection member 350 coupled to the belt 210a can be easily removed from the buckle 330, thus allowing the user to move away from the accident vehicle.

Preferably, each of the tongue plate 320 and the connection member 350 has an arc shape that is concave on its surface which comes into contact with the body of the user.

As such, the tongue plate 320 and the connection member 350 have arc shapes corresponding to the body of the user that are designed to make contact with the body of the user. The buckle 330 has a shape corresponding to the arc shape of the connection member 350, that is, a convex surface corresponding to the arc shape of the connection member 350 is formed on the buckle 330 so that after the buckle 330 is folded onto the connection member 350 to make contact with it, the buckle 330 is reliably maintained in a state of close contact with the connection member 350.

Therefore, when the user wears the safety belt 100, the tongue plate 320 and the connection member 350 that have arc shapes can reliably come into close contact with the body of the user. In the case where the safety belt 100 is not in use, after the buckle 330 and the connection member 350 are folded around the junction therebetween, the buckle 330 can be reliably maintained in a state of close contact with the connection member 350.

The operation of the safety belt according to the present invention having the above-mentioned construction will be described with reference to an example of the case of a driver's seat.

Figure 9:
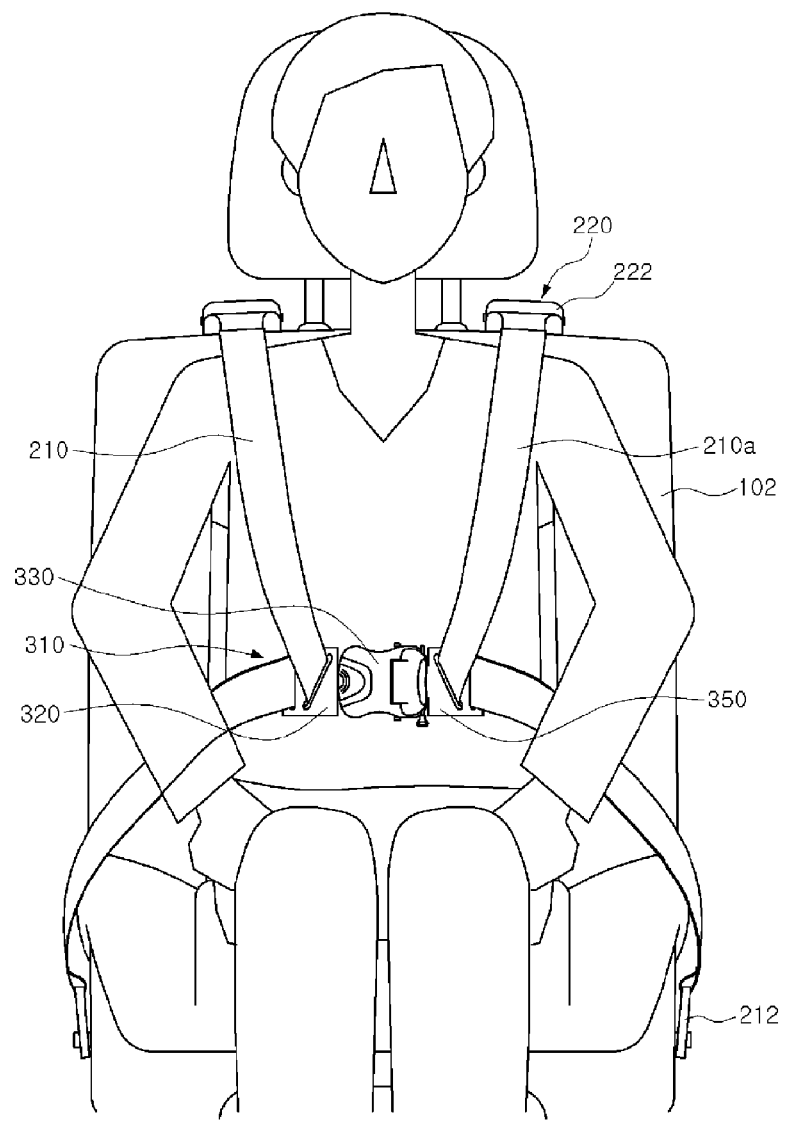
FIG. 9 is a view showing a user who is wearing the safety belt to illustrate the operation of the safety belt according to the present invention.
Figure 10:
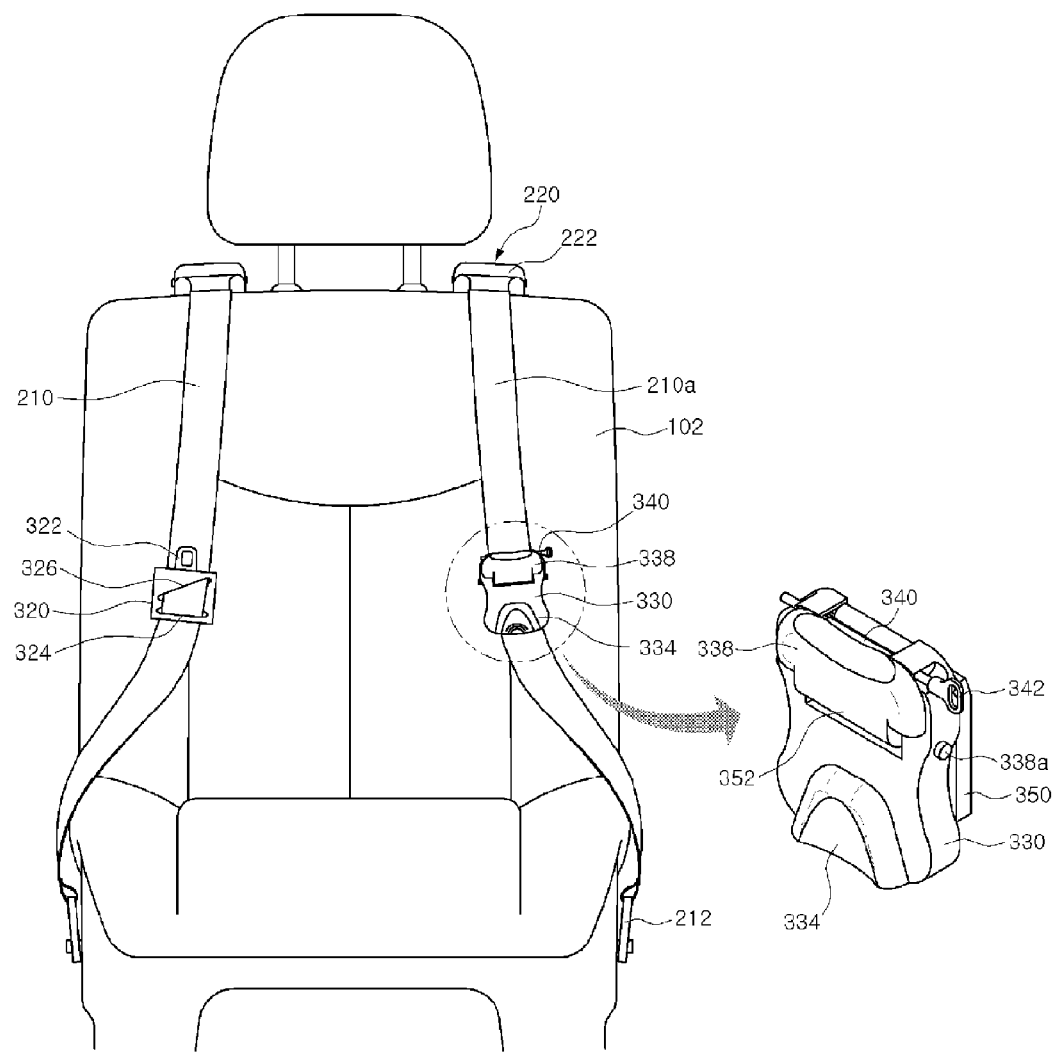
FIG. 10 is a view showing the safety belt which is not in use, illustrating the operation of the safety belt according to the present invention.
Figure 11:
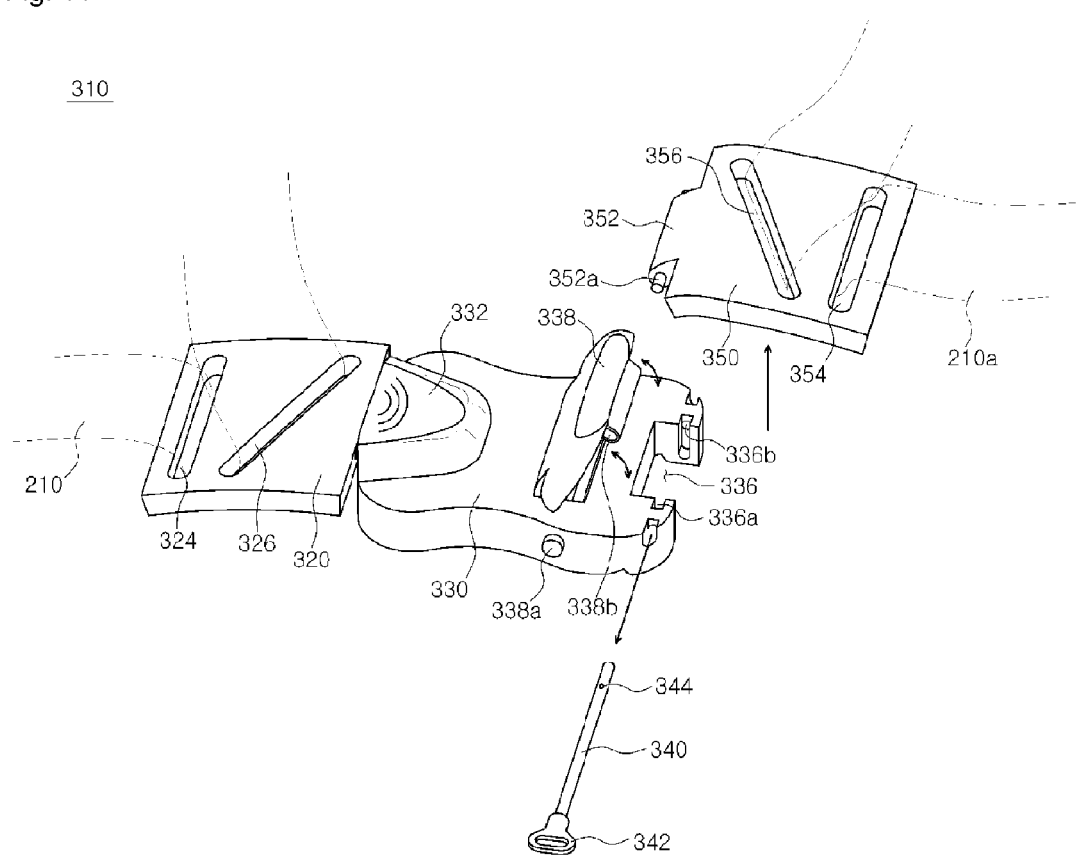
FIG. 11 is a view showing the operation of the safety belt according to the present invention, illustrating the buckle being forcibly unlocked.

FIG. 9 is a view showing the user who is wearing the safety belt to illustrate the operation of the safety belt according to the present invention. FIG. 10 is a view showing the safety belt which is not in use, illustrating the operation of the safety belt according to the present invention. FIG. 11 is a view showing the operation of the safety belt according to the present invention, illustrating the buckle being forcibly unlocked.

As shown in the drawings, in the safety belt 100 according to the present invention, a driver sits on the seat and puts the belts 210 and 210a on his/her shoulders. Subsequently, the driver fastens the tongue plate 320 of the fastening unit 310 to the buckle 330, thus completing the wearing of the safety belt 100.

In the present invention, the belts 210 and 210a support the shoulders of the driver in a manner similar to wearing suspenders, thus allowing the driver to freely move. Further, the belts 210 and 210a do not compress the chest or abdomen of the driver, thus making it possible for the driver to drive the vehicle in a comfortable position.

If the vehicle is involved in a collision after the driver has fastened the safety belt 100, the belts 210 and 210a supports the shoulders of the driver so that an impact caused by the collision is dispersed over the entire body of the driver rather than being concentrated on one spot, thus preventing the driver from suffering from enterorrhexis, fracture of spine, etc.

Meanwhile, when the angle at which the seat back 102 is inclined is adjusted, for example, when the seat back 102 is inclined backwards, each retractor 110 rotates around the hinge shaft 106 due to its on weight such that the retractor 110 is always in the vertical state. Thereby, the belt 210, 210a can be reliably extracted from or retracted into the retractor 110.

Furthermore, when the speed of the vehicle which is in motion reaches the preset speed, the motor 132 of the control unit 130 is operated to rotate the rotary member 134. Because of the rotation of the rotary member 134, the contact protrusion 136 pushes the control shaft 116a upwards. When the control shaft 116a that is pushed by the contact protrusion 136 upwards reaches the uppermost position, the motor 132 stops.

As such, when the contact protrusion 136 of the rotary member 134 pushes the control shaft 116a upwards, the control shaft 116a moves the pawl 119a of the operating lever 119 to engage the pawl 119a with the ratchet teeth 114a of the drum 114 so that the belt 210, 210a can no longer be extracted from the retractor 110. Thereby, the driver can be maintained in a state of being held by the belts 210 and 210a and so be in close contact with the seat back 102.

Meanwhile, in the present invention, the first and second twist prevention slots 326 and 236 are respectively formed in the tongue plate 320 and the connection member 350 of the buckle 330. Therefore, when the safety belt 100 is not in use or the belts 210 and 210a are fastened to each other so that the safety belt 100 can be worn, the belts 210 and 210a are prevented from being twisted.

Furthermore, the belt 210 is coupled to the tongue plate 320 by the first insert slot 324 and the first twist prevention slot 326. Thus, when the safety belt 100 is not in use, the tongue plate 320 can maintain a state of close contact with the seat back 102.

Also, the belt 210a is coupled to the connection member 250 of the buckle 330 in the same manner as the method of coupling the belt 210 to the first insert slot 324 and the first twist prevention slot 326 of the tongue plate 320. Thus, the belt 210a is prevented from being twisted. When the safety belt 100 is not in use, the buckle 330 rotates around the connection junction between the buckle 330 and the connection member 350. Thereby, the buckle 330 is brought into close contact with the upper portion of the connection member 350 so that the buckle 330 can be reliably maintained in a state of being in close contact with the seat back 102.

Meanwhile, when the vehicle which is in motion is involved in a collision, the tongue plate 320 and the buckle 330 of the safety belt 100 may be damaged and thus not be separated from each other. At this time, the user who is wearing the safety belt 100 holds the handle 342 of the release pin 340 which has been locked to the buckle 330 and strongly pulls it. Then, the release pin 340 is removed from the buckle 330 so that the cover member 338 can open. Thereafter, the connection member 350 is separated from the buckle 330, thus allowing the user to be easily released from the safety belt 100.

As a result, the user can easily unfasten the safety belt 100 to safely escape from the vehicle which has been in an accident.

As described above, in a safety belt for a vehicle according to the present invention, belts which are configured in a shape similar to that of suspenders support the shoulders of a user, for example, a driver, who is sitting on a seat. Thus, when the vehicle is in motion, pressure is prevented from being concentrated on portion of the body of the driver. Therefore, the present invention makes it possible for the driver to drive the vehicle in a comfortable position.

Furthermore, because the belts support the shoulders of the driver, impact caused by a vehicle collision can be evenly dispersed to the entire upper body of the driver, thus more effectively preventing the driver from being injured.

In addition, each of a buckle and a tongue plate has an insert slot to which the corresponding belt is coupled, and a twist prevention slot which prevents the belt from being twisted. Because the belt is double-coupled to the insert slot and the twist prevention slot, the belt can be reliably prevented from being twisted.

Further, retractors are received in a rear surface of a seat back. The upper end of each retractor is rotatably supported by a hinge. Thus, even when the driver adjusts the angle at which the seat back is inclined depending on the body type of the driver, the retractors can always be maintained in the vertical state, thus preventing the retractors from malfunctioning.

Moreover, the retractors that are received in the rear surface of the seat back are covered with a cover plate. Hence, repair or maintenance of the retractors can be facilitated.

Also, each retractor is provided with a control unit so that when the speed of the vehicle which is in motion reaches a preset degree, the belt is automatically restricted from being unwound from the retractor. Thus, the present invention can stably support the driver on the seat back and protect the driver from safety accidents which may occur while the vehicle is in motion.

Furthermore, belt guide members which guide the corresponding belts are provided on the upper end of the seat back. Thus, the belts are guided by the belt guide members so that the belts pass over the same portions of both sides of the body of the driver. Therefore, when a vehicle collision occurs, the present invention prevents the driver from suffering from enterorrhexis, fracture of spine, etc.

In addition, a release pin is provided in the buckle to allow the driver to forcibly unfasten the safety belt. Thus, even if the safety belt cannot be unfastened when a vehicle collision occurs, the driver can use the release pin to forcibly unfasten the safety belt and safely escape from the vehicle which has been in an accident.

Although the preferred embodiment of the safety belt for vehicles according to the present invention has been disclosed for illustrative purposes, the present invention is not limited to this embodiment and can be applied to typical retractors or buckles which are installed in vehicles. Furthermore, those skilled in the art will appreciate that various modifications, additions and substitutions are possible, without departing from the scope and spirit of the invention as disclosed in the accompanying claims.

What is claimed is:

1. A safety belt for a vehicle, comprising:
a pair of retractors provided in a rear surface of a seat back;
a pair of belts extracting from the respective retractors and extending on a front surface of the seat back in a vertical direction; and
a fastening unit for fastening the pair of belts to each other, wherein the fastening unit comprises:
a tongue plate provided on either of the pair of belts; and
a buckle provided on a remaining one of the pair of belts at a position corresponding to the tongue plate so that the tongue plate is removably fastened to the buckle,
wherein the buckle comprises a connection member disposed on a first end of the buckle opposite to a second end thereof to which the tongue plate is fastened, the connection member having:
a second insert slot into which the corresponding belt is inserted; and
a second twist prevention slot into which the belt is inserted, the second twist prevention slot being disposed at a position adjacent to the second insert slot and at a slant with respect to the second insert slot to prevent the belt from being twisted,
wherein an open recess is formed in the first end of the buckle in such a way that the first end of the buckle is open, wherein seating depressions corresponding to each other are formed in respective inner sidewalls of the open recess, and a through hole is formed in each of the seating depressions,
a cover member is provided on the buckle to cover the seating depression, the cover member being hinged at a first end thereof to the buckle, with a coupling hole formed in a second end of the cover member, and
a release pin is inserted into the through holes of the open recess via the coupling hole of the cover member.

2. The safety belt as set forth in claim 1, wherein an installation depression is formed in the rear surface of the seat back, and a hinge shaft is provided in the installation depression, wherein the retractors are disposed in the installation depression and are rotatably coupled to the hinge shaft.

3. The safety belt as set forth in claim 2, wherein stoppers are provided on the hinge shaft on opposite sides of each of the retractors.

4. The safety belt as set forth in claim 2, wherein guide depressions are formed in the seat back, the guide depressions extending from the installation depression in a vertical direction, wherein the guide depressions function to guide the corresponding belts extracted from the retractors.

5. The safety belt as set forth in claim 2, further comprising:
a cover plate covering the rear surface of the seat back.

6. The safety belt as set forth in claim 2, further comprising:
belt guide members respectively provided at both sides on an upper end of the seat back, the belt guide members guiding the corresponding belts.

7. The safety belt as set forth in claim 6, wherein each of the belt guide members comprises:
a casing fastened to the upper end of the seat back, with holes respectively formed in front and rear ends of the casing; and
a guide shaft provided in the casing.

8. The safety belt as set forth in claim 1, wherein each of the retractors comprises:
a body to which a drum is coupled, the drum having ratchet teeth, wherein the corresponding belt is wound around the drum;
a ball disposed in the body at a predetermined position below the ratchet teeth, with a control shaft coupled to the ball;
a ball housing onto which the ball is seated, the ball housing having a hole into which a lower end of the control shaft is inserted; and
an operating lever having a pawl at a predetermined position thereof, the pawl being locked to or removed from the ratchet teeth when the ball is moved by vertical movement of the control shaft.

9. The safety belt as set forth in claim 8, wherein the retractor further comprises:
a control unit controlling unwinding of the belt.

10. The safety belt as set forth in claim 9, wherein the control unit comprises:
a motor provided in a side of the body of the retractor in which the ratchet teeth are formed; and
a rotary member reversibly rotated by the motor, with a contact protrusion provided on a circumferential outer surface of the rotary member, the contact protrusion coming into contact with or moving away from the control shaft.

11. The safety belt as set forth in claim 10, further comprising:
a control box operating the motor.

12. The safety belt as set forth in claim 11, further comprising:
a switch provided on the control box so that when the switch is operated, the pawl of the operating lever which has been locked to the ratchet teeth is removed from the ratchet teeth for a predetermined time.

13. The safety belt as set forth in claim 1, further comprising:
anchors coupled to ends of the respective belts, the anchors being fixed to opposite sidewalls of a lower end of the seat back so that the belts are disposed on opposite sides of the front surface of the seat back.

14. The safety belt as set forth in claim 1, wherein the tongue plate comprises a hook locked to or unlocked from the buckle, and the tongue plate has:

a first insert slot into which the corresponding belt is inserted, the first insert slot being disposed at a side opposite to the hook; and
a first twist prevention slot into which the belt is inserted, the first twist prevention slot being disposed at a position adjacent to the first insert slot and at a slant with respect to the first insert slot to prevent the belt from being twisted.

15. The safety belt as set forth in claim 1, wherein the connection member comprises an insert part inserted into the open recess of the buckle, the insert part having seating protrusions seated into the respective seating depressions.

16. The safety belt as set forth in claim 15, wherein the release pin has a handle on a first end thereof, with a locking ball provided in a second end of the release pin.

17. The safety belt as set forth in claim 1, wherein each of the tongue plate and the connection member has an arc shape that is concave with respect to a body of a user, and the buckle has an arc shape that is convex to correspond to the arc shape of the connection member.

* * * * *